(12) United States Patent
Park

(10) Patent No.: US 12,157,462 B2
(45) Date of Patent: Dec. 3, 2024

(54) VEHICLE CONTROL SYSTEM AND METHOD

(71) Applicant: HYUNDAI MOBIS CO., LTD., Seoul (KR)

(72) Inventor: Ge O Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 48 days.

(21) Appl. No.: 17/691,324

(22) Filed: Mar. 10, 2022

(65) Prior Publication Data

US 2022/0297685 A1 Sep. 22, 2022

(30) Foreign Application Priority Data

Mar. 18, 2021 (KR) .................. 10-2021-0035265

(51) Int. Cl.
*B60W 30/09* (2012.01)
*B60Q 9/00* (2006.01)
(Continued)

(52) U.S. Cl.
CPC ............. *B60W 30/09* (2013.01); *B60Q 9/008* (2013.01); *B60W 30/0956* (2013.01);
(Continued)

(58) Field of Classification Search
CPC ............. B60W 30/09; B60W 30/0956; B60W 40/04; B60W 50/14; B60W 2050/143; B60W 2050/146; B60W 2420/42; B60W 2420/52; B60W 2420/54; B60W 2554/4041; B60W 2556/35; B60W 30/08; B60W 40/02; B60W 40/10; B60W 2552/50; B60Q 9/008; B60Q 1/525; G01S 13/62; G01S 13/862; G01S 13/867; G01S 13/931; G01S 15/62; G01S 2013/93271; G01S 2015/937; G06V 20/584; B60Y 2300/08; B60R 21/0134
See application file for complete search history.

(56) References Cited

U.S. PATENT DOCUMENTS 11,879,978 B1 * 1/2024 Das .................. G01S 7/4802
2011/0190972 A1 * 8/2011 Timmons ............ G08G 1/167
701/31.4

(Continued)

FOREIGN PATENT DOCUMENTS

CN 111126171 A * 5/2020
DE 102016010289 A1 * 4/2017
KR 10-2011-0117990 A 10/2011

*Primary Examiner* — Peter D Nolan
*Assistant Examiner* — Demetra R Smith-Stewart
(74) *Attorney, Agent, or Firm* — NSIP Law

(57) ABSTRACT

A system for controlling a subject vehicle includes a front detection unit to detect a driving situation of a target vehicle located in front of the subject vehicle; a determination unit to detect reversing of the target vehicle or predict a collision between the target vehicle and the subject vehicle through the front detection unit; and a control unit to, when the reversing of the target vehicle is detected or the collision between target vehicle and the subject vehicle is predicted through the determination unit, generate a warning signal of the subject vehicle or control driving of the subject vehicle so that the subject vehicle avoids the collision with the target vehicle.

15 Claims, 4 Drawing Sheets

(51) Int. Cl.
*B60W 30/095* (2012.01)
*B60W 40/04* (2006.01)
*B60W 50/14* (2020.01)
*G01S 13/62* (2006.01)
*G01S 13/86* (2006.01)
*G01S 13/931* (2020.01)
*G01S 15/62* (2006.01)
*G01S 15/931* (2020.01)
*G06V 20/58* (2022.01)

(52) U.S. Cl.
CPC ............ *B60W 40/04* (2013.01); *B60W 50/14* (2013.01); *G01S 13/62* (2013.01); *G01S 13/862* (2013.01); *G01S 13/867* (2013.01); *G01S 13/931* (2013.01); *G01S 15/62* (2013.01); *G01S 15/931* (2013.01); *G06V 20/584* (2022.01); *B60W 2050/143* (2013.01); *B60W 2050/146* (2013.01); *B60W 2420/403* (2013.01); *B60W 2420/408* (2024.01); *B60W 2420/54* (2013.01); *B60W 2554/4041* (2020.02); *B60W 2556/35* (2020.02); *G01S 2013/93271* (2020.01); *G01S 2015/937* (2013.01)

(56) References Cited

U.S. PATENT DOCUMENTS

| | | | | |
|---|---|---|---|---|
| 2019/0276013 A1* | 9/2019 | Kim | ............... | G06V 20/588 |
| 2020/0207340 A1* | 7/2020 | Hayami | ............ | G06V 20/584 |
| 2020/0361430 A1* | 11/2020 | Kim | ............... | B60T 7/22 |
| 2021/0188277 A1* | 6/2021 | Song | ............ | B60W 60/001 |
| 2022/0334258 A1* | 10/2022 | Kim | ............... | G01S 7/4802 |

\* cited by examiner

VEHICLE CONTROL SYSTEM AND METHOD

CROSS-REFERENCE TO RELATED APPLICATION(S)

This application is based on and claims priority under 35 U.S.C. 119 to Korean Patent Application No. 10-2021-0035265, filed on Mar. 18, 2021, in the Korean Intellectual Property Office, the disclosure of which is herein incorporated by reference in its entirety.

BACKGROUND OF THE INVENTION

1. Field of the Invention

The present disclosure relates to a system and a method for controlling a vehicle and, more particularly, to a technology for controlling a vehicle so as to prevent a collision between the vehicle and a vehicle in front due to reversing of the vehicle in front

2. Description of the Prior Art

Nowadays, vehicles have various additional functions and thus provide convenience to drivers. For example, vehicle navigation systems have been introduced in line with development of global positioning system (GPS), thereby providing convenience and information to drivers. Such vehicle navigation systems may provide drivers with current location information, destination location information, and information regarding paths to the destination, thereby providing convenience to drivers.

Moreover, recent vehicles are equipped with various systems such as an in-vehicle black boxes and lane departure warning systems (LDW).

As described above, there is a need for an apparatus and a method capable of receiving vehicle outside information and actively coping therewith. For example, there is a conventional system for detecting the distance between a vehicle and another vehicle in front and generating a warning signal.

However, there has been a request for a technology for detecting the reversing of the vehicle in front and controlling the vehicle so as to prevent a collision therewith due to the reversing of the vehicle in front.

The above descriptions regarding background technologies have been made only to help understanding of the background of the present disclosure, and are not to be deemed by those skilled in the art to correspond to already-known prior arts.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a system for controlling a subject vehicle includes: a front detection unit configured to detect a driving situation of a target vehicle located in front of the subject vehicle; a determination unit configured to detect reversing of the target vehicle or predict a collision between the target vehicle and the subject vehicle through the front detection unit; and a control unit configured to, when the reversing of the target vehicle is detected or the collision between target vehicle and the subject vehicle is predicted through the determination unit, generate a warning signal of the subject vehicle or control driving of the subject vehicle so that the subject vehicle avoids the collision with the target vehicle.

The front detection unit may be connected to a camera sensor disposed in the subject vehicle, and may be configured to detect the reversing of the target vehicle by detecting a reversing light of the target vehicle through the camera sensor.

The determination unit may be connected to a radar sensor or an ultrasonic sensor disposed in the subject vehicle to detect movement of the target vehicle.

The determination unit may be configured to perform sensor fusion on detection information detected by the radar sensor or the ultrasonic sensor to predict the collision between the subject vehicle and the target vehicle.

The determination unit may be configured to calculate movement information of the target vehicle, to predict a position of the target vehicle after a predetermined time based on the movement information, and to predict the collision between the subject vehicle and the target vehicle.

The determination unit may be configured to divide a collision time between the target vehicle and the subject vehicle into a warning rage and a dangerous range according to a predetermined collision time range, and the control unit may be configured to generate the warning signal of the subject vehicle according to the warning range and the dangerous range or to control the driving of the subject vehicle.

The determination unit may be configured to determine, when the collision time between the target vehicle and the subject vehicle is equal to or greater than the predetermined collision time, the collision time as the warning range, and the control unit may be configured to generate the warning signal to a driver or outside the subject vehicle when the warning range is detected by the determination unit.

The determination unit may be configured to determine, when the collision time between the target vehicle and the subject vehicle is within the predetermined collision time, the collision time into the dangerous range, and the control unit may be configured to control the driving of the subject vehicle so that the subject vehicle moves when the dangerous range is detected by the determination unit.

The system may include an obstacle detection unit configured to detect an obstacle or an extra space located adjacent to the subject vehicle, and when the collision between the subject vehicle and the target vehicle is predicted by the determination unit, the obstacle detection unit may be configured to detect the extra space, and the control unit may be configured to control the driving of the subject vehicle to move the subject vehicle to the extra space.

The system may include a transmission unit configured to detect an external vehicle adjacent to the subject vehicle and to transmit movement information of the subject vehicle so that the external vehicle moves, and when the collision between the subject vehicle and the target vehicle is detected by the determination unit, the transmission unit may be configured to transmit the movement information of the subject vehicle to the external vehicle to move the external vehicle, and the control unit may be configured to move the subject vehicle to an extra space in which the external vehicle moves.

In another general aspect, a method for controlling a subject vehicle includes: detecting a driving situation of a target vehicle located in front of the subject vehicle; detecting reversing of the target vehicle or predicting a collision between the target vehicle and the subject vehicle through a front detection unit; and when the reversing of the target vehicle is detected or the collision between the subject vehicle and the target vehicle is predicted, generating a warning signal of the subject vehicle or controlling the driving of the subject vehicle so that the subject vehicle avoids the collision with the target vehicle.

The method may include dividing a range according to a predetermined collision time based on a collision time between the target vehicle and the subject vehicle predicted in the predicting, and the controlling may include generating a warning signal of the subject vehicle according to the divided range or controlling the driving of the subject vehicle so that the subject vehicle avoids the collision with the target vehicle.

The method may include determining the collision time as a warning range when the collision time between the subject vehicle and the target vehicle predicted in the dividing is equal to or greater than the predetermined collision time, and the controlling may include generating the warning signal to a driver or outside the subject vehicle after determining the collision time as the warning range.

The method may include determining the collision time as a dangerous range when the collision time between the target vehicle and the subject vehicle predicted in the dividing is within the predetermined collision time, and the controlling may include controlling the driving of the subject vehicle so that the subject vehicle moves after determining the collision time as the warning range.

The method may include detecting an extra space located adjacent to the subject vehicle, and the controlling may include controlling the driving of the subject vehicle so that the subject vehicle moves to the extra space when the extra space is detected after determining the collision time as the dangerous range.

The method may include detecting an external vehicle adjacent to the subject vehicle when the extra space is not detected, and transmitting movement information of the subject vehicle so that the external vehicle moves, and the controlling may include controlling the driving of the subject vehicle so that the subject vehicle moves to the extra space when the external vehicle moves after transmitting the movement information.

Other features and aspects will be apparent from the following detailed description, the drawings, and the claims.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
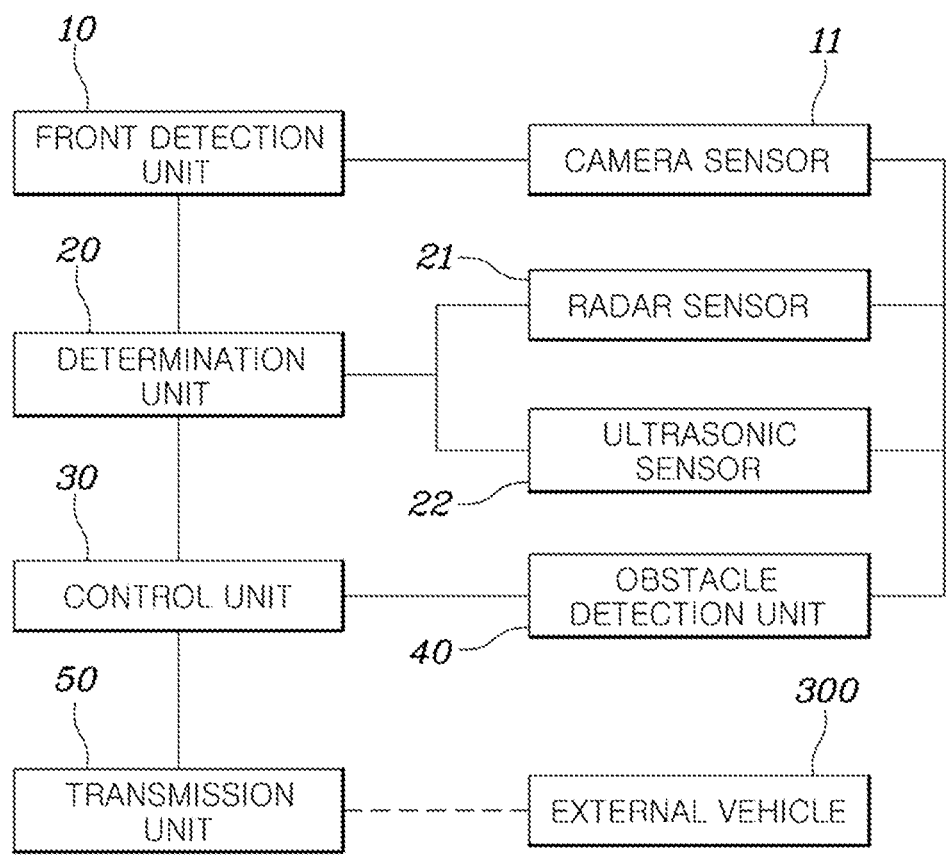
FIG. 1 is a block diagram illustrating a system for controlling a vehicle according to an embodiment of the disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. In the respective drawings, identical or like reference signs denote identical or like components.

A front detection unit 10, a determination unit 20, a control unit 30, an obstacle detection unit 40, and a transmission unit 50 according to an embodiment of the disclosure may be implemented through a nonvolatile memory (not shown) configured to store an algorithm configured to control operations of various components of a vehicle 100 or data relating to software instructions for reproducing the algorithm, and a processor (not shown) configured to perform operations which will be described below using data stored in the corresponding memory. Here, the memory and the processor may be implemented as separate chips. Alternatively, the memory and processor may be implemented as a single chip integrated with each other. The processor may have the form of one or more processors.

Figure 2:
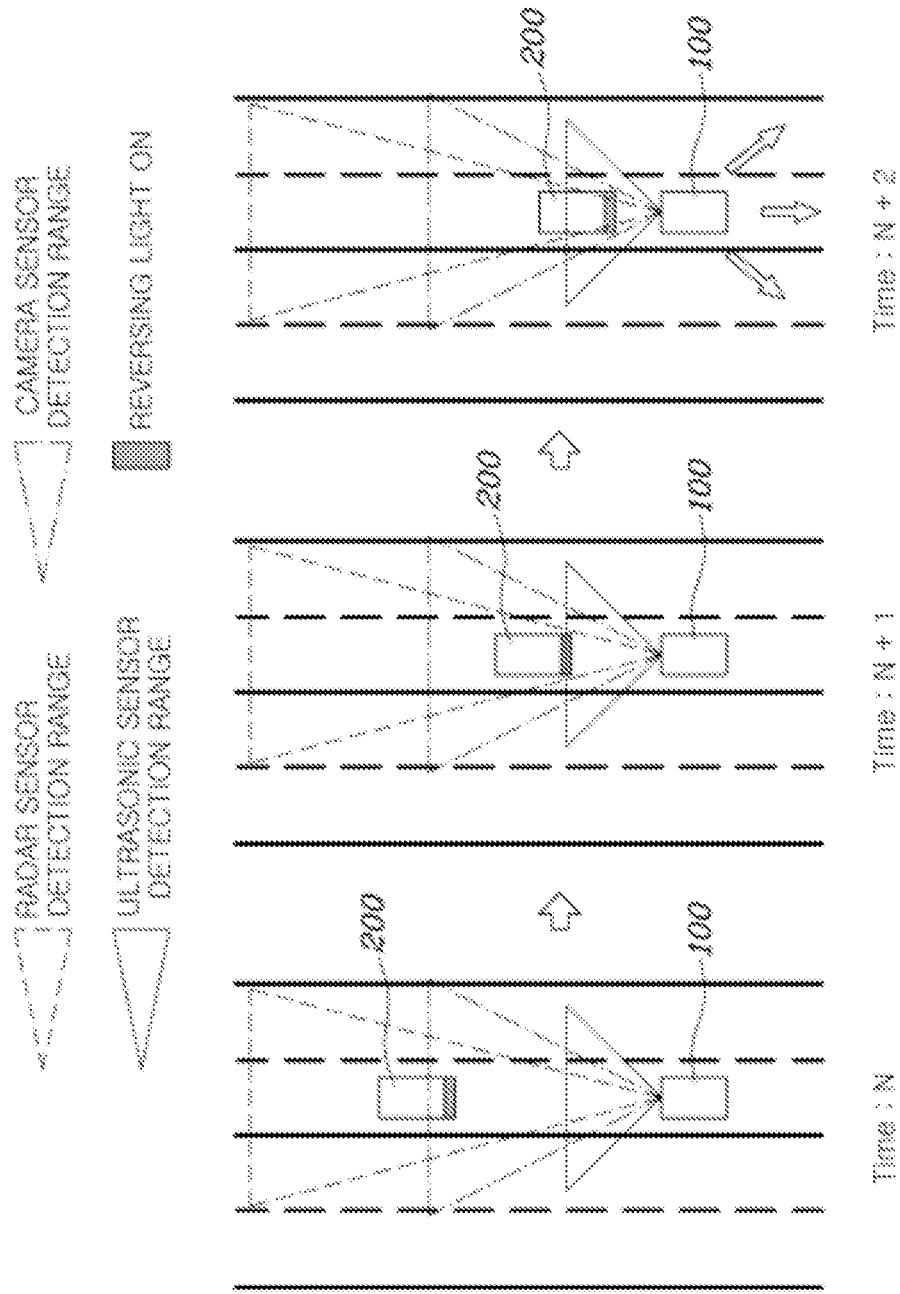
FIGS. 2 to 3 are diagrams illustrating a method of controlling the movement of a vehicle over time.
Figure 3:
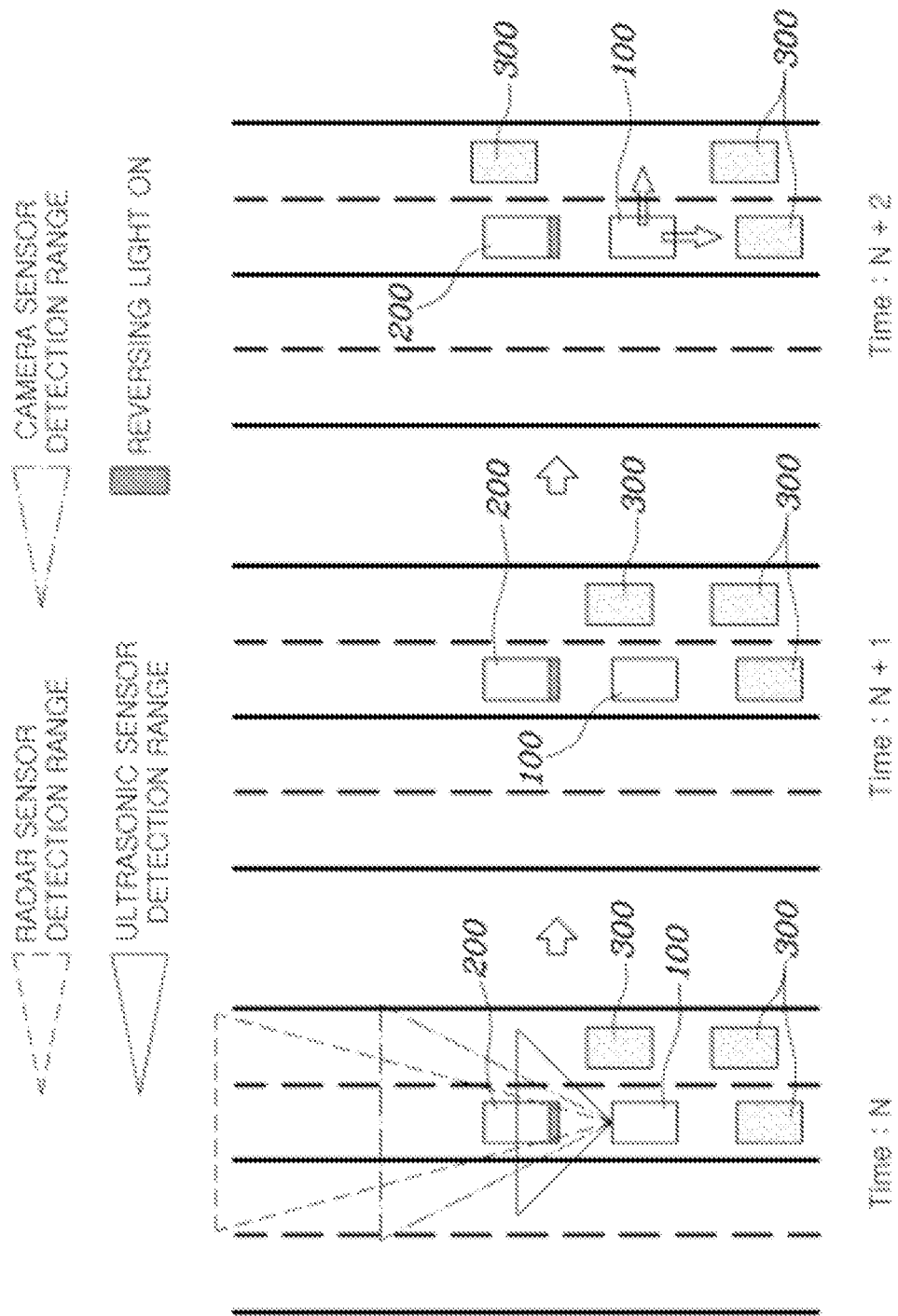

FIG. 1 is a block diagram illustrating a system for controlling a vehicle 100 according to an embodiment of the disclosure, and FIGS. 2 to 3 are diagrams illustrating a method of controlling the movement of a vehicle 100 over time.

A preferred embodiment of the system for controlling the vehicle 100 according to the disclosure will be described with reference to FIGS. 1 to 3.

The system for controlling the vehicle 100 according to the disclosure includes a front detection unit 10 configured to detect a driving situation of a vehicle 200 in front; a determination unit 20 configured to detect reversing of the vehicle 200 in front or predict a collision between the vehicle 200 in front and the vehicle 100 through the front detection unit 10; and a control unit configured to, when the reversing of the vehicle 200 in front is detected or the collision between vehicle 200 in front and the vehicle 100 is predicted through the determination unit 20, generate a warning signal of the vehicle 100 or control the driving of the vehicle 100 so that the vehicle 100 avoids the collision with the vehicle 200 in front.

The system for controlling the vehicle according to the disclosure may be applied to the autonomous vehicle 100 or the general vehicle 100, and the driving control of the vehicle 100 may be applied to the autonomous vehicle 100. In addition, the generation of the warning signal may also be applied to the general vehicle 100.

The front detection unit 10 may detect the driving situation of the vehicle 200 in front and may calculate a moving direction of the vehicle 200 in front.

The determination unit 20 may detect a reverse driving situation of the vehicle 200 in front based on the driving situation of the vehicle 200 in front detected by the front detection unit 10, and may detect the speed or direction at which the vehicle 200 in front moves backwards to predict a collision between the vehicle 100 and the vehicle 200 in front.

When the determination unit 20 detects the reverse driving of the vehicle 200 in front or predicts the collision between the vehicle 100 and the vehicle 200 in front, the control unit 30 may generate a warning signal inside and outside the vehicle 100 or may control, in the case of the autonomous vehicle 100, the driving of the vehicle 100 to move the vehicle 100 so that the collision between the vehicle 100 and the vehicle 200 in front can be avoided.

When the warning signal is generated inside and outside the vehicle 100, in the case of the general car 100, the driver of the vehicle 100 may promptly control the operation of the vehicle 100 due to the warning signal generated inside the vehicle 100 to prevent the collision with the vehicle 200 in front. When the warning signal is generated outside the vehicle 100, the driver of the vehicle 200 in front may recognize the vehicle 100 located at the rear when driving backward, and may stop the rear driving.

In addition, in the case of the autonomous vehicle 100, there is an effect of preventing a collision accident by moving the vehicle 100 to avoid the collision between the vehicle 100 and the vehicle 200 in front.

The front detection unit 10 may be connected to a camera sensor 11 provided in the vehicle 100 and may detect a reversing light of the vehicle 200 in front through the camera sensor 11 to detect the reverse situation of the vehicle 200 in front.

As illustrated in FIGS. 2 to 3, the front detection unit 10 may be connected to the camera sensor 11 provided in the vehicle 100 to detect the driving light at the rear of the vehicle 200 in front, and may divide the driving light into an accelerator light, a brake light, or a reversing light by the camera sensor 11 to calculate the driving state of the vehicle 200 in front.

Through this, the driving state of the vehicle 200 in front may be detected, and the moving speed of the vehicle 200 in front may be additionally calculated through the camera sensor 11.

Accordingly, there is an effect of accurately detecting the driving state of the vehicle 200 in front, and based on this, the warning signal or driving of the vehicle 100 may be controlled.

The determination unit 20 may be connected to a radar sensor 21 or an ultrasonic sensor 22 provided in the vehicle 100 to detect the movement of the vehicle 200 in front and to predict the collision between the vehicle 100 and the vehicle 200 in front.

As illustrated in FIGS. 2 and 3, the determination unit 20 may be connected to the radar sensor 21 or the ultrasonic sensor 22 which are provided in the vehicle 100 to detect an obstacle in front, thereby detecting the moving speed of the vehicle 200 in front or a distance from the vehicle 200 in front, and predicting the collision time between the vehicle 100 and the vehicle 200 in front based on the moving speed of the vehicle 200 in front and the distance between the vehicle 100 and the vehicle 200 in front.

In addition, the determination unit 20 may perform sensor fusion on detection information detected by the radar sensor 21 and the ultrasonic sensor 22 provided in the vehicle 100, thereby predicting the collision between the vehicle 100 and the vehicle 200 in front.

The determination unit 20 may be connected to the radar sensor 21 and the ultrasonic sensor 22 provided in the vehicle 100, and may perform sensor fusion on the detection information of the radar sensor 21 and the detection information of the ultrasonic sensor 22 to detect the vehicle 200 in front when the vehicle 200 in front is detected at a position where the detection ranges of the radar sensor 21 and the ultrasonic sensor 22 overlap as illustrated in FIGS. 2 and 3.

Through this, there is an effect that the vehicle 200 in front can be accurately detected by performing sensor fusion on detection information obtained from a plurality of sensors rather than detecting the vehicle 200 in front only using a single sensor.

The determination unit 20 may calculate movement information of the vehicle 200 in front, and may predict the position of the vehicle 200 in front after a predetermined time based on the calculated movement information, thereby predicting the collision between the vehicle 200 in front and the vehicle 100.

As illustrated in FIGS. 2 and 3, the front detection unit 10 may detect the moving direction of the vehicle 200 in front, and the determining unit 20 may detect the moving speed of the vehicle 200 in front. Alternatively, the determination unit 20 may perform machine learning based on the detected moving speed of the vehicle 200 in front to predict the position of the vehicle 200 in front after a predetermined time or the collision time between the vehicle 100 and the vehicle 200 in front.

The movement of the vehicle 100 may be controlled based on the position of the vehicle 200 in front after the predicted predetermined time.

The determination unit 20 may divide the predicted collision time between the vehicle 100 and the vehicle 200 in front into a warning range or a dangerous range according to a predetermined collision time range, and the control unit 30 may generate the warning signal of the vehicle 100 or control the driving of the vehicle 100 according to the ranges divided by the determination unit 20.

The determination unit 20 may predict the collision time between the vehicle 100 and the vehicle 200 in front based on the reverse speed of the vehicle 200 in front and the distance between the vehicle 100 and the vehicle 200 in front, and may divide the collision time into the predetermined range. The control unit 30 may generate the warning signal according to the predetermined range or control the driving of the vehicle 100 to avoid the collision with the vehicle in front 200.

For example, in the determination unit 20, when the collision is predicted to occur after 30 seconds, which is a collision predicted time between the vehicle 200 in front and the vehicle 100 and the predetermined range is configured to be 20 seconds until the collision, the range from 30 seconds to 20 seconds may be configured as the warning range, and the range from 20 seconds to 0 second (the collision predicted time) may be configured as the dangerous range.

Accordingly, there is an effect that the control unit 30 may generate the warning signal or control the driving of the vehicle 100 according to the configured collision predicted time range to avoid the collision with the vehicle 200 in front.

When the predicted collision time between the vehicle 100 and the vehicle 200 in front is equal to or greater than the predetermined collision time range, the determination unit 20 may divide the collision time into the warning range, and the control unit 30 may generate the warning signal to the driver of the vehicle 100 or outside the vehicle 100 when the warning range is detected by the determination unit 20.

When the collision time predicted by the determination unit 20 is equal to or greater than the predetermined collision time range, the collision time may be divided into the warning range, and the control unit 30 may generate the warning signal within the warning range.

As an example of the warning signal, a warning message may be transmitted to the driver inside the vehicle 100 through a cluster or an av monitor provided in the vehicle 100, a warning sound may be generated through a speaker, or the klaxon of the vehicle 100 may be operated to generate a warning signal to the vehicle 200 in front.

The determination unit 20 may divide the predicted collision time between the vehicle 200 in front and the vehicle 100 into the dangerous range when the collision time is within the predetermined collision time range, and the control unit 30 may control the driving of the vehicle 100 to move the vehicle 100 when the dangerous range is detected by the determination unit 20.

When the collision time predicted by the determination unit 20 is within the predetermined collision time range, the collision time may be divided into the dangerous range, and the control unit 30 may control the driving of the vehicle 100 within the dangerous range.

As illustrated in FIG. 2, the control unit 30 may control the driving of the vehicle 100 when the determination unit 20 determines that the collision time is in the dangerous range, and as an example of this, the control unit 30 may control the steering of the vehicle 100 to move the vehicle 100 to the side.

Through this, there is an effect of avoiding the collision between the vehicle 200 in front and the vehicle 100.

The system for controlling the vehicle 100 according to the disclosure may further include an obstacle detection unit 40 configured to detect an obstacle or an extra space located adjacent to the vehicle 100. When the collision between the vehicle 100 and the vehicle 200 in front is predicted by the determination unit 20, the obstacle detection unit 40 may detect the extra space, and the control unit 30 may control the driving of the vehicle 100 to move the vehicle 100 to the extra space.

As illustrated in FIG. 3, in order to control the movement of the vehicle 100, the obstacle detection unit 40 may detect an obstacle or an extra space located adjacent to the vehicle 100, and the control unit 30 may move the vehicle 100 to the extra space by avoiding the obstacle when controlling the driving of the vehicle 100.

The obstacle detection unit 40 may be connected to the radar sensor 21, the ultrasonic sensor 22, or the camera sensor 11 mounted on the vehicle 100 to detect the obstacle adjacent to the vehicle 100.

Through this, it is possible to prevent the vehicle 100 from colliding with an external obstacle when the vehicle 100 moves while avoiding the vehicle 200 in front.

In addition, the system for controlling the vehicle 100 according to the disclosure may further include a transmission unit 50 configured to detect an external vehicle 300 adjacent to the vehicle 100 and transmit movement information of the vehicle 100 so that the external vehicle 300 moves. When the collision between the vehicle 100 and the vehicle 200 in front is detected by the determination unit 20, the transmission unit 50 may transmit the movement information of the vehicle 100 to the external vehicle 300 to move the external vehicle 300, and the control unit 30 may move the vehicle 100 to an extra space in which the external vehicle 300 moves.

When the obstacle adjacent to the vehicle 100 is the external vehicle 300 as illustrated in FIG. 3, the transmission unit 50 may wirelessly communicate with the external vehicle 300 to transmit the moving direction of the vehicle 100, and the vehicle 100 may move to an extra space formed after the external vehicle 300 moves.

Through this, it is possible to safely avoid the collision with the vehicle 200 in front.

Figure 4:
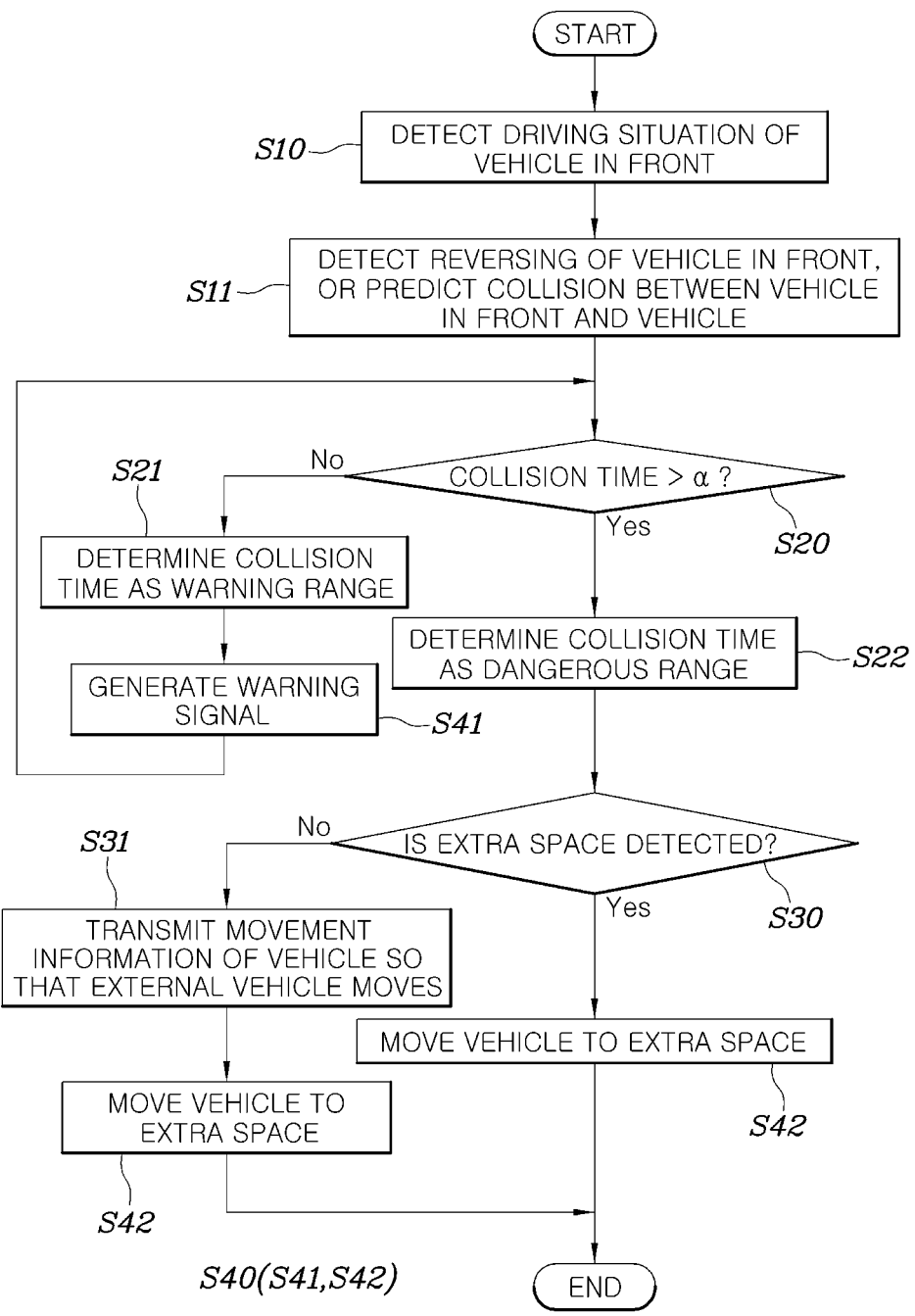
FIG. 4 is a flowchart illustrating a vehicle control method according to an embodiment of the disclosure.

FIG. 4 is a flowchart illustrating a method for controlling the vehicle 100 according to an embodiment of the disclosure.

A preferred embodiment of the method for controlling the vehicle 100 according to the disclosure will be described with reference to FIG. 4.

The method for controlling the vehicle 100 according to the disclosure includes detecting (S10) a driving situation of the vehicle 200 in front; detecting (S11) the reversing of the vehicle 200 in front or predicting a collision between the vehicle 200 in front and the vehicle 100 through a front detection unit 10; and generating (S40), when the reversing of the vehicle 200 in front is detected or the collision between the vehicle 100 and the vehicle 200 in front is predicted, a warning signal of the vehicle 100 or controlling the driving of the vehicle 100 so that the vehicle 100 avoids the collision with the vehicle 200 in front.

The method for controlling the vehicle 100 according to the disclosure may further include dividing (S20) a collision time between the vehicle 100 and the vehicle 200 in front predicted in the predicting (S11) according to a predetermined collision time. The controlling S40 may include generating a warning signal of the vehicle 100 according to the divided range or controlling the driving of the vehicle 100 so that the vehicle 100 avoids the collision with the vehicle 200 in front.

The method for controlling the vehicle 100 according to the disclosure may further include determining (S21), when the collision time between the vehicle 100 and the vehicle 200 in front predicted in the dividing (S20) is equal to or greater than the predetermined collision time, the collision time as a warning range. The controlling (S40) may include generating (S41) a warning signal to a driver or outside the vehicle 100 after the determining (S21) the collision time as the warning range.

The method for controlling the vehicle 100 according to the disclosure may further include determining (S22) the collision time as a dangerous range when the collision time between the vehicle 200 in front and the vehicle 100 predicted in the dividing (S20) is within the predetermined collision time. The controlling (S40) may include controlling (S42) the driving of the vehicle 100 so that the vehicle 100 moves after the determining the collision time as the warning range.

The method for controlling the vehicle 100 according to the disclosure may further include detecting (S30) an extra space located adjacent to the vehicle 100. The controlling (S40) may include controlling (S42) the driving of the vehicle 100 so that the vehicle 100 moves to the extra space when the extra space is detected after the determining (S22) the collision time as the dangerous range.

The method for controlling the vehicle 100 according to the disclosure may further include detecting an external vehicle 300 adjacent to the vehicle 100 when the extra space is not detected in the detecting the extra space, and transmitting movement information of the vehicle 100 so that the external vehicle 300 moves. The controlling (S40) may include controlling (S42) the driving of the vehicle 100 so that the vehicle 100 moves to the extra space when the external vehicle 300 moves after the transmitting the movement information.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A system for controlling a subject vehicle, the system comprising:
   a front detection unit comprising a radar sensor and an ultrasonic sensor configured to detect a driving situation of a target vehicle located in front of the subject vehicle, wherein the detection of the driving situation of the target vehicle comprises detection of a speed and movement direction of the target vehicle in relation to the subject vehicle;
   a determination unit configured, based on the speed and movement direction of the target vehicle detected by the front detection unit, to:
      determine that the target vehicle is reversing based on the speed and movement direction; or
      predict a collision between the target vehicle and the subject vehicle based on the speed and movement direction; and
   a control unit configured to:
      in response to the determination of the reversing of the target vehicle or the prediction of the collision between the reversing target vehicle and the subject vehicle, determine a collision time between the target vehicle and the subject vehicle; and
      based on the determined collision time, generate a warning signal of the subject vehicle or control driving of the subject vehicle so that the subject vehicle avoids the collision with the target vehicle,
   wherein the determination unit further configured to perform sensor fusion on detection information detected by the radar sensor and the ultrasonic sensor where detection ranges of the radar sensor and the ultrasonic sensory overlap to predict the collision between the subject vehicle and the target vehicle.

2. The system of claim 1,
   wherein the front detection unit is connected to a camera sensor disposed in the subject vehicle, and
   wherein the front detection unit is further configured to detect the reversing of the target vehicle by detecting a reversing light of the target vehicle through the camera sensor.

3. The system of claim 1, wherein the determination unit is further configured to:
   calculate movement information of the target vehicle, to predict a position of the target vehicle after a predetermined time based on the movement information; and
   predict the collision between the subject vehicle and the target vehicle.

4. The system of claim 1,
   wherein the determination unit is configured to divide the collision time between the target vehicle and the subject vehicle into a warning range and a dangerous range according to a predetermined collision time range, and
   wherein the control unit is further configured to:
      generate the warning signal of the subject vehicle according to the warning range and the dangerous range; or
      control the driving of the subject vehicle.

5. The system of claim 4,
   wherein the determination unit is further configured to determine, in response to the collision time between the target vehicle and the subject vehicle being equal to or greater than the predetermined collision time, the collision time as the warning range, and
   wherein the control unit is further configured to generate the warning signal to a driver or outside the subject vehicle in response to the warning range being detected by the determination unit.

6. The system of claim 4,
   wherein the determination unit is further configured to convert, in response to the collision time between the target vehicle and the subject vehicle being within the predetermined collision time, the collision time into the dangerous range, and
   wherein the control unit is further configured to control the driving of the subject vehicle so that the subject vehicle moves in response to the dangerous range being detected by the determination unit.

7. The system of claim 1, further comprising:
   an obstacle detection unit configured to:
      detect an obstacle or an extra space located adjacent to the subject vehicle; and
      in response to the collision between the subject vehicle and the target vehicle being predicted by the determination unit, detect the extra space, wherein, based on the detected extra space, the control unit is further configured to control the driving of the subject vehicle to move the subject vehicle to the extra space.

8. The system of claim 1, further comprising:
a transmission unit configured to:
detect an external vehicle adjacent to the subject vehicle; and
transmit movement information of the subject vehicle so that the external vehicle moves,
wherein, in response to the collision between the subject vehicle and the target vehicle being detected by the determination unit, the transmission unit is further configured to transmit the movement information of the subject vehicle to the external vehicle for movement of the external vehicle, and the control unit is further configured to move the subject vehicle to an extra space in which the external vehicle moves.

9. A method for controlling a subject vehicle, the method comprising:
detecting a driving situation of a target vehicle located in front of the subject vehicle, wherein the detection of the driving situation of the target vehicle comprises detection of a speed and movement direction of the target vehicle in relation to the subject vehicle;
detecting reversing of the target vehicle or predicting a collision between the target vehicle and the subject vehicle through a front detection unit by performing sensor fusion on detection information detected by a radar sensor and an ultrasonic sensor where detection ranges of the radar sensor and the ultrasonic sensor overlap; and
in response to the detection of the reversing of the target vehicle or prediction of the collision between the subject vehicle and the reversing target vehicle, determining a collision time between the target vehicle and the subject vehicle; and
based on the determined collision time, generating a warning signal of the subject vehicle or controlling the driving of the subject vehicle so that the subject vehicle avoids the collision with the target vehicle.

10. The method of claim 9, further comprising:
dividing a range according to a predetermined collision time based on the collision time between the target vehicle and the subject vehicle predicted in the predicting,
wherein the controlling of the driving of the subject vehicle includes:
generating a warning signal of the subject vehicle according to the divided range; or
controlling the driving of the subject vehicle so that the subject vehicle avoids the collision with the target vehicle.

11. The method of claim 10, further comprising:
determining the collision time as a warning range in response to the collision time between the subject vehicle and the target vehicle being predicted in the dividing is equal to or greater than the predetermined collision time,
wherein the controlling of the driving of the subject vehicle includes generating the warning signal to a driver or outside the subject vehicle after determining the collision time as the warning range.

12. The method of claim 10, further comprising:
determining the collision time as a dangerous range in response to the collision time between the target vehicle and the subject vehicle being predicted in the dividing is within the predetermined collision time,
wherein the controlling of the driving of the subject vehicle includes controlling the driving of the subject vehicle so that the subject vehicle moves after determining the collision time as the warning range.

13. The method of claim 12, further comprising:
detecting an extra space located adjacent to the subject vehicle,
wherein the controlling of the driving of the subject vehicle includes moving the subject vehicle to the extra space in response to the extra space being detected after determining the collision time as the dangerous range.

14. The method of claim 13, further comprising:
detecting an external vehicle adjacent to the subject vehicle in response to the extra space not being detected; and
transmitting movement information of the subject vehicle so that the external vehicle moves,
wherein the controlling of the driving of the subject vehicle includes moving the subject vehicle to the extra space in response to the external vehicle moving after transmitting the movement information.

15. A system for controlling a subject vehicle, comprising:
a front end detector comprising a radar sensor and an ultrasonic sensor disposed in the subject vehicle configured to detect whether a target vehicle is moving in a reverse direction toward the subject vehicle;
a sensor disposed in the subject vehicle to predict whether a collision between the target vehicle and the subject vehicle will occur; and
a controller configured to:
generate a warning signal by the subject vehicle when it is determined that the target vehicle is moving in the reverse direction toward the subject vehicle; and
when it is predicted that a collision with occur between the target vehicle and the subject vehicle, control the subject vehicle to avoid the collision, wherein movement information of the target vehicle is calculated to predict a position of the target vehicle after a predetermined time based on the movement information, which is used to predict the collision between the subject vehicle and the target vehicle,
wherein the front end detector is further configured to perform sensor fusion on detection information detected by the radar sensor and the ultrasonic sensor where detection ranges of the radar sensor and the ultrasonic overlap to predict the collision between the subject vehicle and the target vehicle.

* * * * *